(12) United States Patent
Zeng

(10) Patent No.: US 7,523,125 B2
(45) Date of Patent: Apr. 21, 2009

(54) PARSING SYSTEM

(75) Inventor: Licheng Zeng, Baulkham Hills (AU)

(73) Assignee: Mastersoft Research Pty Limited, Chatswood (AU)

( * ) Notice: Subject to any disclaimer, the term of this patent is extended or adjusted under 35 U.S.C. 154(b) by 877 days.

(21) Appl. No.: 09/883,123

(22) Filed: Jun. 15, 2001

(65) Prior Publication Data

US 2002/0111951 A1    Aug. 15, 2002

(30) Foreign Application Priority Data

May 18, 2001    (AU) .................................. PR5113

(51) Int. Cl.
*G06F 17/00*    (2006.01)
(52) U.S. Cl. .................. 707/102; 707/100; 707/101; 707/3
(58) Field of Classification Search ......... 707/100–102, 707/103 Y, 3, 1, 4, 104.1; 706/48; 704/9, 704/270.1
See application file for complete search history.

(56) References Cited

U.S. PATENT DOCUMENTS

| | | | | |
|---|---|---|---|---|
| 5,257,185 A * | 10/1993 | Farley et al. ................. | 707/100 |
| 5,500,920 A * | 3/1996 | Kupiec ..................... | 704/270.1 |
| 6,182,029 B1 * | 1/2001 | Friedman ....................... | 704/9 |
| 6,182,062 B1 * | 1/2001 | Fujisawa et al. ................ | 707/3 |
| 6,272,495 B1 * | 8/2001 | Hetherington ............... | 707/101 |
| 6,584,464 B1 * | 6/2003 | Warthen ........................ | 707/4 |
| 6,675,159 B1 * | 1/2004 | Lin et al. ........................ | 707/3 |
| 2004/0122656 A1 * | 6/2004 | Abir .............................. | 704/4 |

\* cited by examiner

*Primary Examiner*—Sana Al-Hashemi
(74) *Attorney, Agent, or Firm*—Stetina Brunda Garred & Brucker; Lowell Anderson

(57) ABSTRACT

A system of parsing unstructured or partially structured data is provided, specifically including name and address data in any language or script. The system processes at least portions of the data in an incremental manner, preferably using multiple parsing steps, with each parsing step performed by consulting an inference engine which uses an inference strategy. A knowledge base is used with the inference engine to analyze data at one or more levels of analysis. The knowledge base can optionally include a lexico-grammatical analysis level, and orthographic level, a semantic level, a contextual level.

1 Claim, 23 Drawing Sheets

Figure 1. The conceptual parsing architecture.

Input buffer: the data structure that contains the character string to be parsed. We assume the characters are encoded by UNICODE.

existing information structure new information structure refined information structure extension

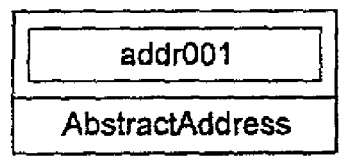
| Token | lexical type |
|---|---|
| unit | (subdwellinigClassifier) |
| 14 | (numeric) |
| a | (affix) |
| , | (segment-marker) |
| 12 | (numeric) |
| - | (range-marker) |
| 14 | (numeric) |
| Lane | (thoroughFareClassifier) \| (properName) |
| Cove | (thoroughFareClassifier) \| (properName) |
| road | (thoroughFareClassifier) \| (properName) |
| , | (segment-marker) |
| Ryde | (properName) |
| , | (segment-marker) |
| NSW | (stateName) |
| 2113 | (AreaCode) |
Figure 19.1 Initial state of parsing.
FIG. 19.1

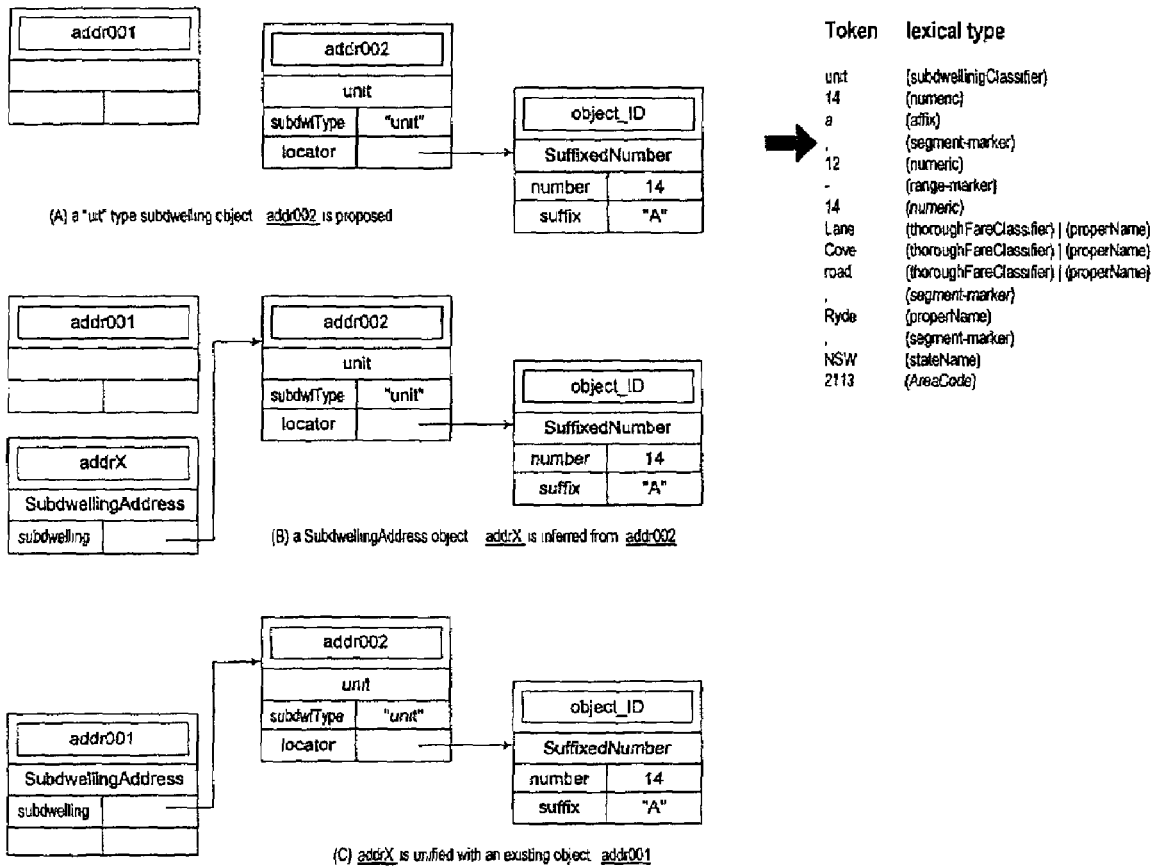
Figure 19.2. Address objects built after parsing "unit 14A".
FIG. 19.2

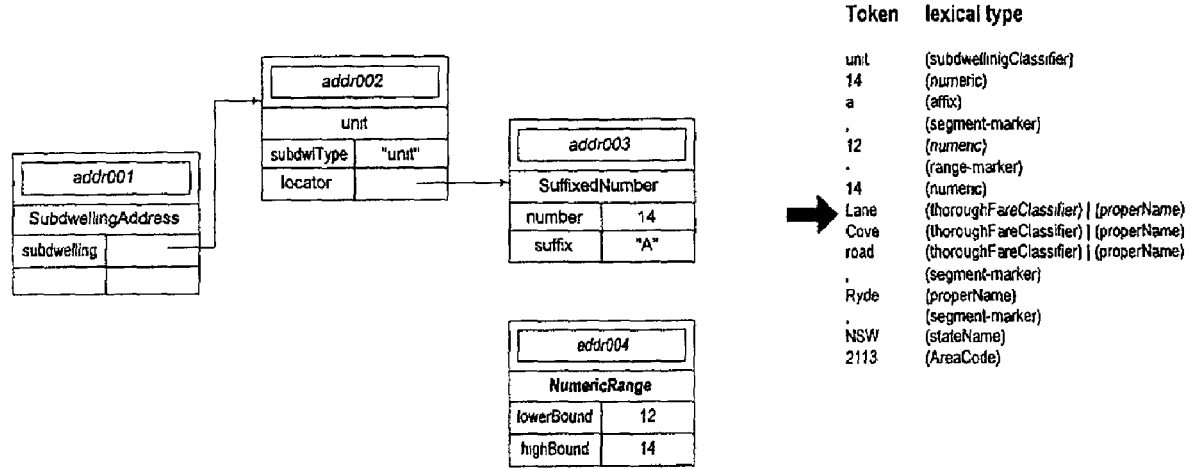
Figure 19.3. Temporary information structure held in stack.
FIG. 19.3

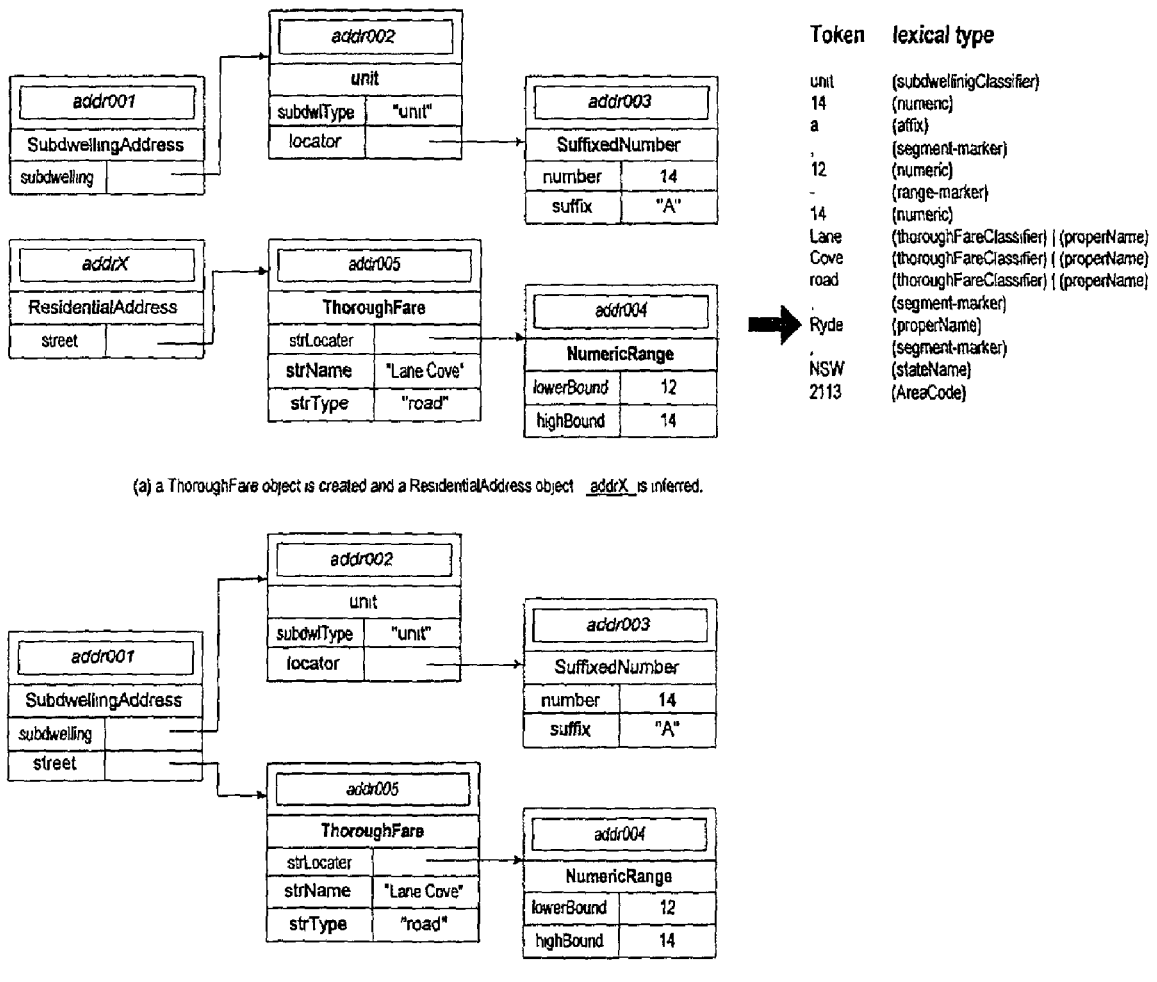
Figure 19.4. Information structure obtained after parsing "12-14 Lane Cove Road".
FIG. 19.4

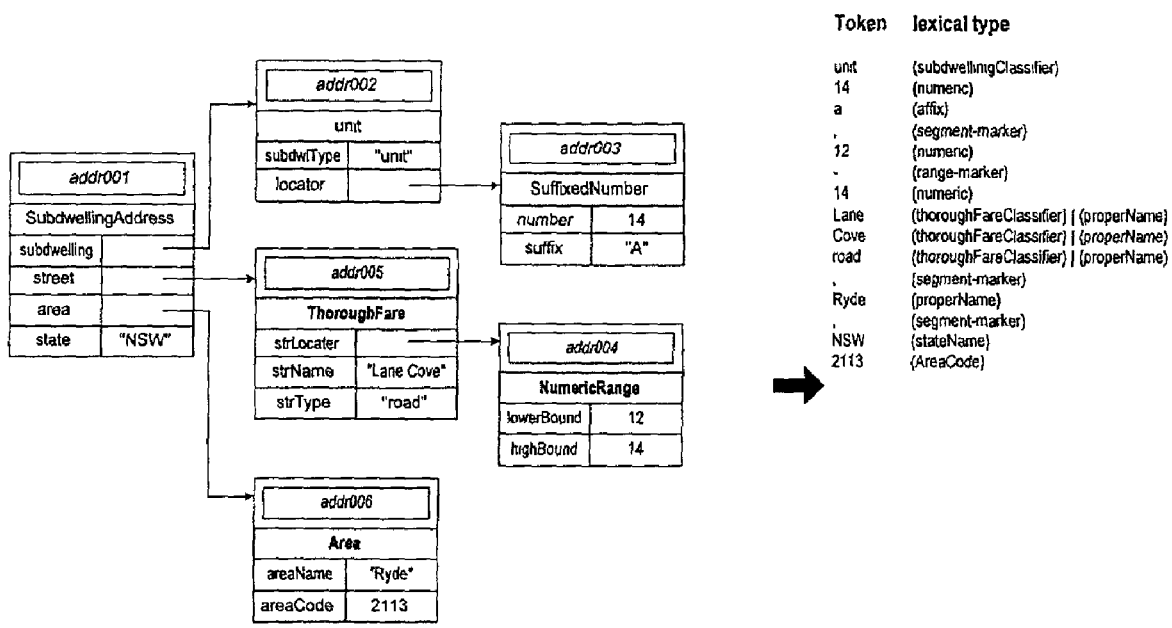
Figure 19.5. The final address information structure.
FIG. 19.5

PARSING SYSTEM

CROSS-REFERENCE TO RELATED APPLICATIONS

This application claims the benefit of Australian Provisional Application No. PR5113, filed May 18, 2001.

STATEMENT RE: FEDERALLY SPONSORED RESEARCH/DEVELOPMENT (Not Applicable)

BACKGROUND OF THE INVENTION

The present invention relates to a parsing system and, more particularly, to such a system suited, although not exclusively, to the parsing of partially structured information in the form of address listings.

There is frequently the requirement in commerce these days to manage and make sense of large volumes of data.

An allied problem frequently encountered is that of taking partially structured information or information that has been structured for a different purpose or for a different platform and processing it so as to achieve a fully structured arrangement or an arrangement which has been restructured for a specific purpose or for a different platform.

One particular example occurs in the field of name and address management and listing where, for example, one commercial enterprise may have a listing of its clients' names and addresses suited for processing in a particular way and on a particular platform which is subsequently required to be transferred to a different platform or rearranged so as to be suitable for use for a different purpose.

Heretofore systems for carrying out these processes have relied upon a serial or pipelined approach.

It is an object of the present invention to provide an alternative approach.

BRIEF SUMMARY OF INVENTION

Accordingly, in one broad form of the invention there is provided a system of parsing unstructured or partially structured data; said system processing at least portions of said data in an incremental manner.

Preferably said processing in an incremental manner comprises multiple parsing steps, each parsing step performed by consulting an inference engine.

In a further broad form of the invention there is provided a knowledge base for use in association with the above described system, said knowledge base analyzing said data at one or more predefined levels of analysis.

Preferably said levels include a level of analysis at a lexico-grammatical level.

Preferably said levels include a level of analysis at an orthographic level.

Preferably said levels include a level of analysis at a semantic level.

Preferably said levels include a level of analysis at a contextual level.

Preferably said knowledge base uses a knowledge representation language which embodies linguistic theory.

Preferably said linguistic theory is that of systematic functional linguistics.

Preferably said linguistic theory enables the complete representation of all possible forms of said data.

Preferably said data is attribute data.

More preferably said attribute data is name and address data.

In yet a further broad form of the invention there is provided a method of parsing an attribute data set; said method comprising incrementally refining elements of said data set until a predefined level of meaning is determined.

Preferably said step of incrementally refining said elements includes execution of an elaboration operator.

Preferably said step of incrementally refining said elements includes execution of an encapsulation operator.

Preferably said step of incrementally refining said elements includes execution of an enhancement operator.

Preferably said step of incrementally refining said elements includes execution of an entailment operator.

Preferably said step of incrementally refining said elements includes execution of an extension operator.

Preferably a best-first searching algorithm is utilized.

Preferably a look-ahead algorithm is utilized.

Preferably an inference strategy is utilized.

In yet a further broad form of the invention there is provided a system for processing an unstructured or partially structured set of data so as to obtain a set of structured data; said system comprising a parser engine in communication with a knowledge database.

Preferably said parser engine is reliant on data in the form of knowledge retained in said knowledge database.

Preferably said system further includes a temporary data store associated with said parser engine.

Preferably said system further includes a data block identifier which provides input to said parser engine.

Preferably said data block identifier breaks said set of unstructured data into a plurality of data blocks for input to said parser engine.

Preferably said parser receives consecutive ones of said data blocks and performs a first association step on said data blocks based on knowledge derived from said knowledge database so as to derive a first postulated categorization of said data blocks and storing said data blocks thereby categorized in said temporary storage means.

Preferably said parser engine performs a confirmation step on said data blocks stored in said temporary storage means so as to either confirm or reject its categorization of said data blocks.

Preferably said knowledge base includes knowledge about the information structures of identifying attribute objects.

Preferably said knowledge database includes knowledge about an association between patterns and the identifying attribute objects they represent.

Preferably a precedence of alternative solutions has been precompiled in said knowledge database thereby to allow best-first searching to be performed by said parser engine.

Preferably said parser engine utilizes a best-first searching algorithm.

Preferably said parser engine utilizes a look-ahead algorithm.

Preferably said parser engine utilizes an inference strategy.

Preferably said data comprises attribute data.

Preferably said attribute data comprises name and address data.

BRIEF DESCRIPTION OF DRAWINGS

Embodiments of the present invention will now be described with reference to the accompanying drawings wherein:

FIG. 19.1 is a block diagram of a first step in a parsing operation performed by the system of FIG. 16;

FIG. 19.2 is a block diagram of a second step in the example of FIG. 19.1;

FIG. 19.3 illustrates in block diagram form the stack of the system of FIG. 1 at a further step in the example of FIG. 19.1;

FIG. 19.4 illustrates a further step in the example of FIG. 19.1; and

FIG. 19.5 illustrates a final result achieved by the example of FIG. 19.1.

DETAILED DESCRIPTION OF PREFERRED EMBODIMENTS

The following definitions are used in this description:

DATA: is utilized in the sense of attribute data where "attributes" can include names, addresses, height, weight, gender for example:

ATTRIBUTE: pertaining to an entity where the entity is a company or a person, for example and in respect of which "attributes" can be identified for example but not limited to names, addresses, height, weight, gender;

PARSING: is a process of incrementally constructing information structures from a collection of lexico-grammatical evidences;

ORTHOGRAPHIC: concerning letters or spelling—at the word constituent level;

SEMANTIC: concerning the meaning of words (in isolation);

LEXICO-GRAMMATICAL: concerning words and the arrangement of words in context to one another such that higher level meaning is derived;

CONTEXTUAL: meaning or associations based on the context or surroundings in which words or phrases or group of words are found.

BEST-FIRST Search: is the process of determining the first "best" solution (using heuristics and backtracking mechanisms) that meets/fits the search criteria from a set of promising solutions that had been earlier identified.

A parsing system 10 according to a first preferred embodiment of the present invention will now be described with reference to FIG. 1. An example of use of the parsing system 10 will then be given in the context of the parsing of name and address data however it should be understood that the system can be applied to other data sets which initially comprise unstructured or ambiguous data and which, following processing by the parser system according to embodiments of the present invention is stored in a more structured or less ambiguous form and suitable for use by other processing systems which would otherwise be confused or rendered useless if the unstructured or ambiguous data set was input directly into them.

Figure 1:
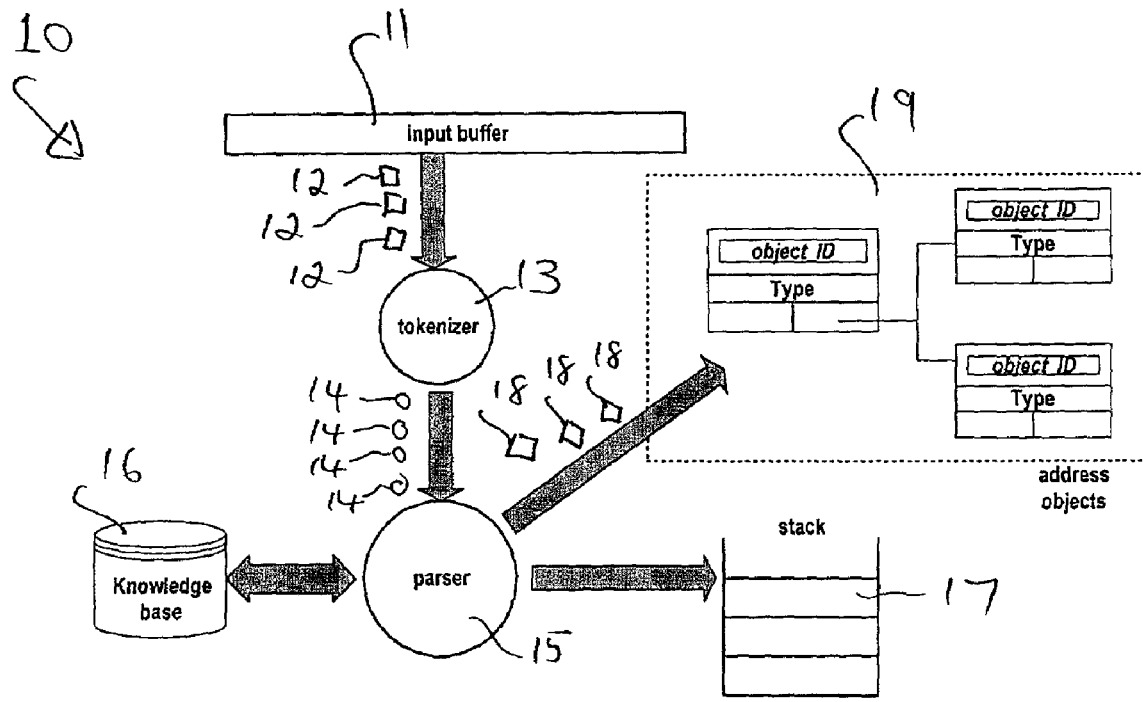
FIG. 1 is a block diagram of a parsing system in accordance with a first embodiment of the present invention.

With reference to FIG. 1 the parsing system 10 comprises a number of interacting components, principle of which are input buffer 11 which feeds data 12 to tokenizer 13 which, in turn, feeds tokens 14 to parser 15.

Parser 15 interacts with knowledge base 16 and stack 17 to produce parsed output data 18 for storage in output data structure 19.

Each of these components forming parsing system 10 will now be described in greater detail with reference to FIGS. 2-15.

KNOWLEDGE BASE

Knowledge Representation Language

Figure 2:
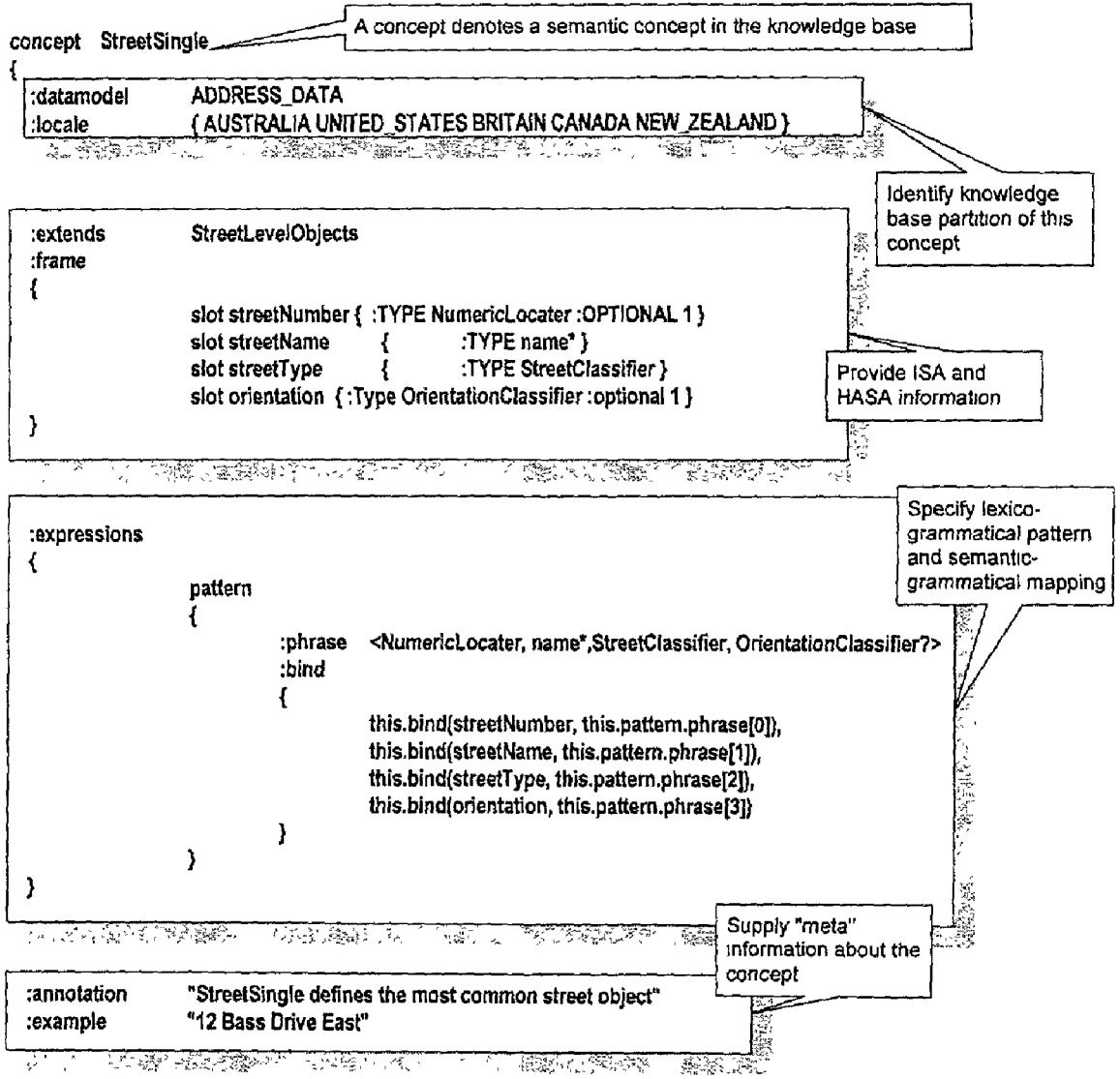
FIG. 2 is a block diagram of encoding the knowledge of a basic data type in the knowledge representation language usable in the system of FIG. 1.

The knowledge about the semantics and lexicogrammar of the linguistic data is encoded in a special formalism called knowledge representation language (KRL). Using KRL, a knowledge engineer (e.g. an expert of name and address data of a particular language) can build a body of executable knowledge about the semantic structures and lexicogrammatical patterns for a selected data type (e.g. name and address data) of a language. FIG. 2 shows an example of encoding the knowledge of a basic street type in KRL. The example defines a concept about street, which is applicable to Australia, US, Britain, Canada and New Zealand. The definition has a section for specifying semantic structures (the :extends and :frame clauses), a section for specifying lexico-grammatical patterns (the :expressions clause), and a section for self documenting (the :example and :annotation clauses).

Figure 3:
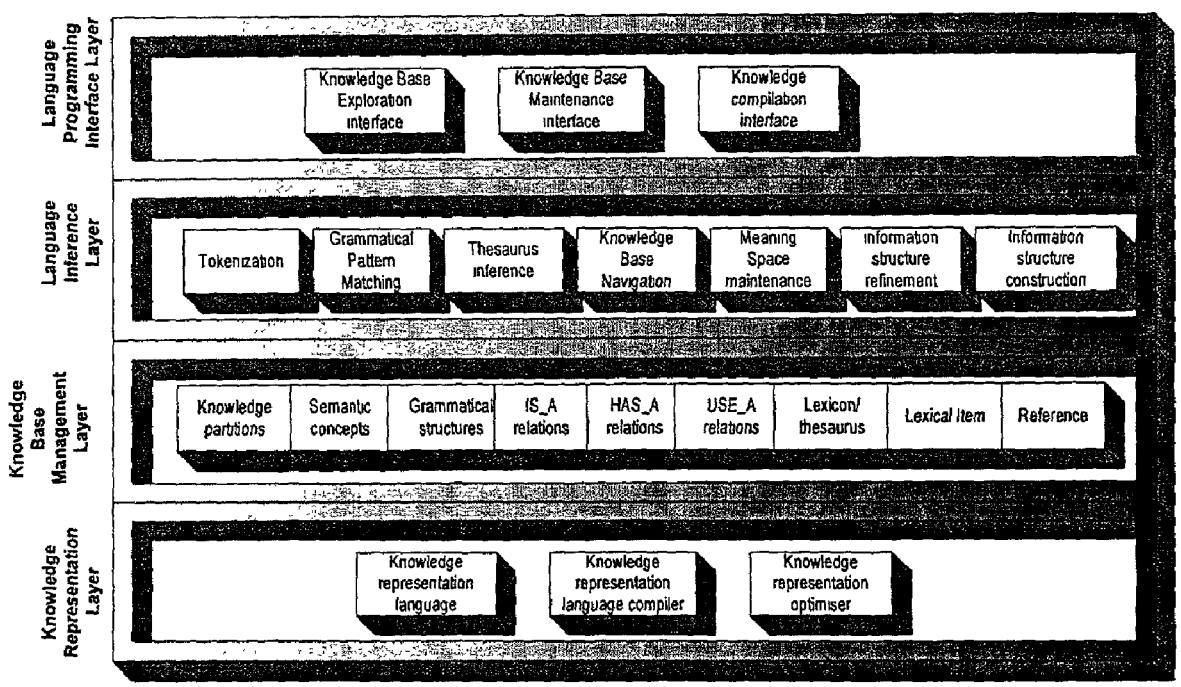
FIG. 3 is a block diagram of the knowledge base structure usable in the system of FIG. 1.

FIG. 3 illustrates the structure of knowledge base 16. The knowledge base is broken down into four layers.

Knowledge representation layer: containing the modules for representing, compiling and optimising KRL.

Knowledge base management layer: containing the instances of knowledge compiled from KRL. This layer maintains all the "artefacts" of knowledge such as ISA relations, lexical items.

Language inference layer: containing a number of inference modules that reason about the language knowledge based on the knowledge instances maintained in the knowledge base management layer. These modules provide applications with the basic services needed for natural language processing, for example, an application can ask the tokenization service to tokenize multilingual text.

Language programming interface layer: containing a set of interfaces to request a particular type of service of the knowledge base. For example, a parser can use the knowledge base exploration interface to locate the service of grammatical pattern matching. A GUI-based knowledge engineering environment can access the knowledge base maintenance interface to visually manage the knowledge instances in the knowledge base management layer.

Knowledge Compilation Process

Figure 4:
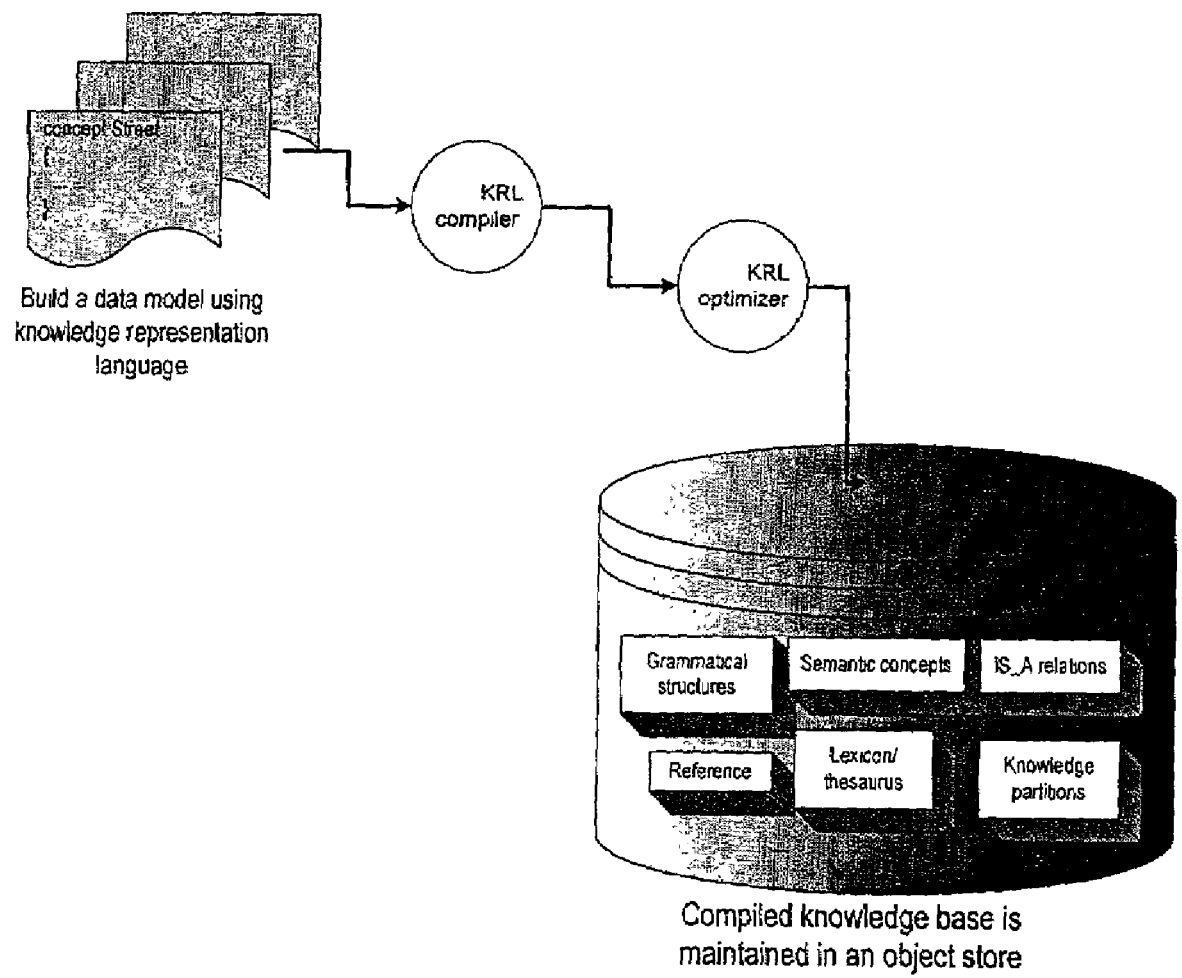
FIG. 4 is a logic flow diagram for the process of operation of the system of FIG. 1.

The knowledge encoded in KRL needs to be compiled into a format that can be easily executed by the parser engine 15. FIG. 4 illustrates a three-step process of knowledge compilation:

KRL definitions are syntactically and semantically checked by KRL compiler, and then they are translated into an intermediate format.

KRL optimizer analyses the intermediate format and generates additional information which could be used by the parser. This additional information is cached with the intermediate format.

Knowledge base manager maps the intermediate format to appropriate knowledge objects and makes them persistent in the knowledge base.

PARSER

Memory Structure of Parser

Figure 5:
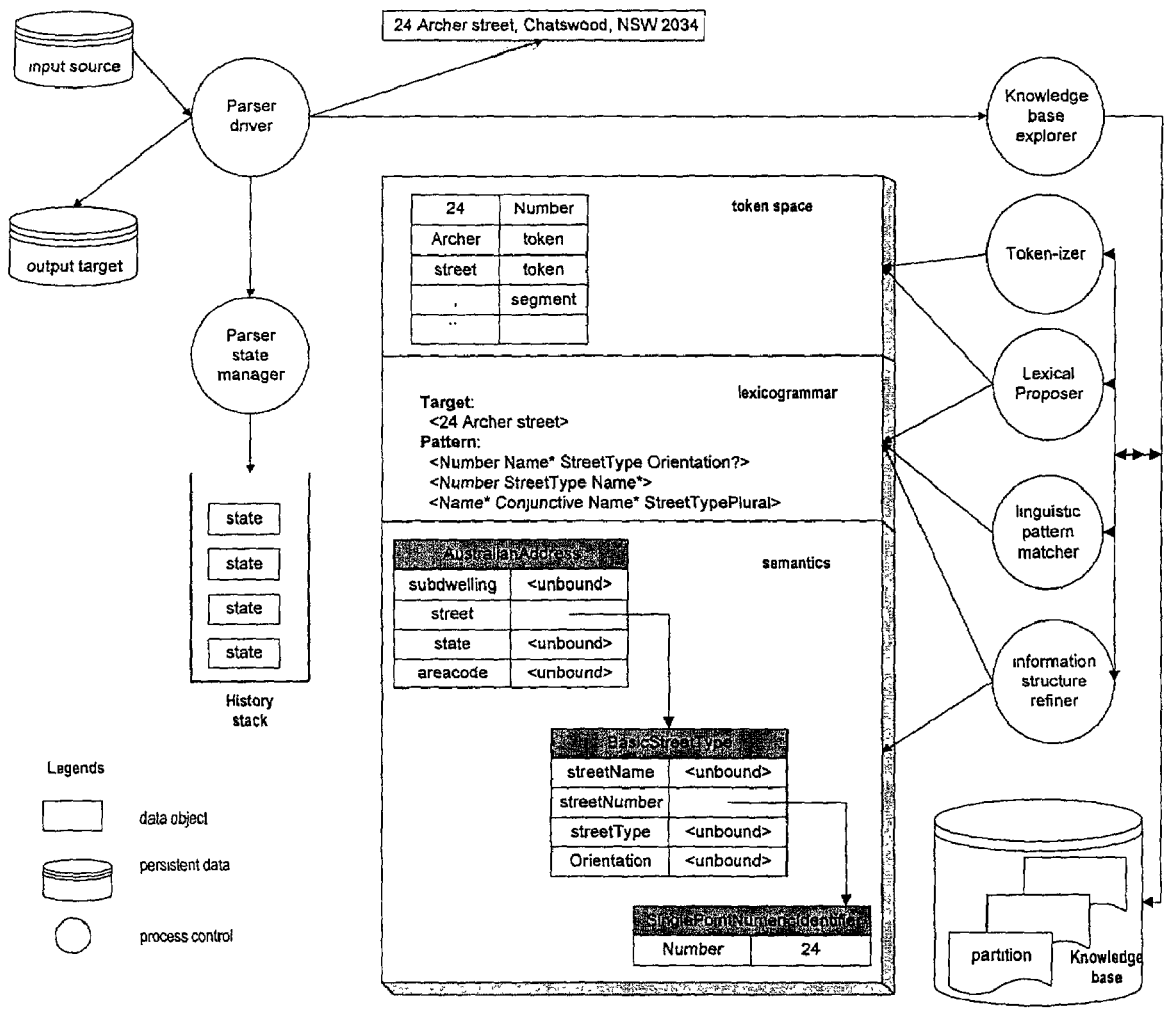
FIG. 5 is a more detailed block diagram of the operation of the system of FIG. 1.

With reference to FIG. 5 parser 15 operates on a complex memory structure during run time. The top-level processes of the parser include:

Parser driver: the control of the entire parser process. It initialises the memory structures, drives the parser process by interacting with various inference modules through a knowledge base explorer, reading input and writing output.

Parser state manager: the component that house-keeps each cycle of parsing. Parser driver asks parser state manager to revert to any state of parsing in case parser fails in some of its interpretation.

Knowledge base explorer: this is the gateway to knowledge base 16. Parser driver accesses the knowledge and inference services housed in the knowledge base. The inference services activated by the knowledge base explorer are: tokenizer, lexical proposer, linguistic pattern matcher and information structure refiner.

The objects active during parsing include:
Parser input.
Parser output.
A list of parser states maintained in a data structure called history stack.
A parser search space which consists of partial information constructed by the parser during the parsing process. The search space is stratified into three levels: a token space with the information of tokens produced from input text; a lexicogrammatical space which contains lexical items and grammatical patterns that are recognised from the input; a semantic space which contains information structures that are conveyed by the lexical and grammatical information maintained in the lexicogrammatical space.

The knowledge base instance.

Parser Algorithm

Figure 6:
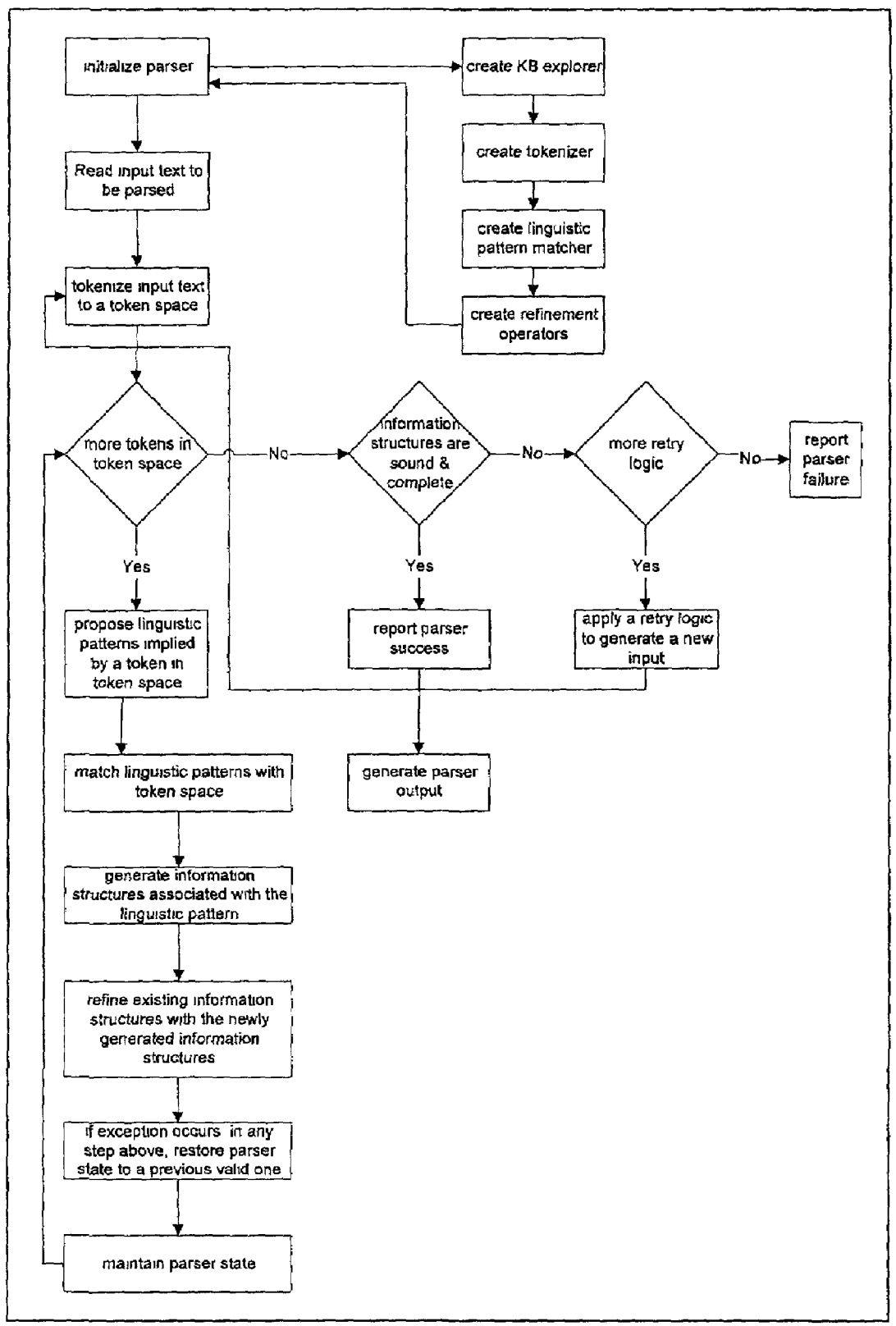
FIG. 6 is a logic flow diagram of the operation of the parser forming part of the system of FIG. 1.

FIG. 6 illustrates the top level algorithm of parser 15. This algorithm can also be expressed by the following pseudo code.

```
Initialise the parser memory structure. This also includes setting up the
knowledge base explorer and the inference services required by the parser.
parser input reader supplies an input text.
1.   Tokenizer inference service tokenize the input text into a list of
     tokens and populates the token space.
While (there are more unprocessed tokens in the token space)
Begin
     Read in a token and mark it processed.
     Knowledge hase explorer proposes some linguistic patterns
     associated with the token. These patterns populate the
     lexicogrammatical space.
     Linguistic pattern matcher matches the proposed linguistic patterns
     against the tokens in the token space.
     If (a linguistic pattern is matched)
         construct the information structures associated with the
         linguistic pattern to the semantic space.
     Information structure refiner refines the semantic space by
     integrating the newly constructed information structures into the
     existing information structures.
     If (any exception occurs)
         parser state manager restores the token space, lexicogrammatical
         space and semantic space to a previous state.
end
If (no more unprocessed tokens and the constructed information structure
is sound and complete)
     Report success and generate parser output.
Else if (there are applicahle retry logic)
     Apply retry logic to reformat the input text and start parsing on this
     input text again.
Else
Report parse failure.
```

PARSER/KNOWLEDGE BASE INTERACTION

Interacting with Knowledge Base During Parsing

As shown in the parser algorithm of FIG. 6, each cycle of parsing consists of a number of steps that invokes services provided by the language inference layer of the knowledge base 16. More specifically, these services include:

Use tokenization service to construct a token space by breaking a character stream into a token sequence.

Use lexical proposal service to propose lexicogrammatical patterns based on an input token.

Use grammatical pattern service to match a pattern against a sequence of input tokens.

Use information structure refinement service to extend semantic coherence.

Use information structure inference service to test if an information structure is sound and complete.

Constructing Token Space

Figure 7:
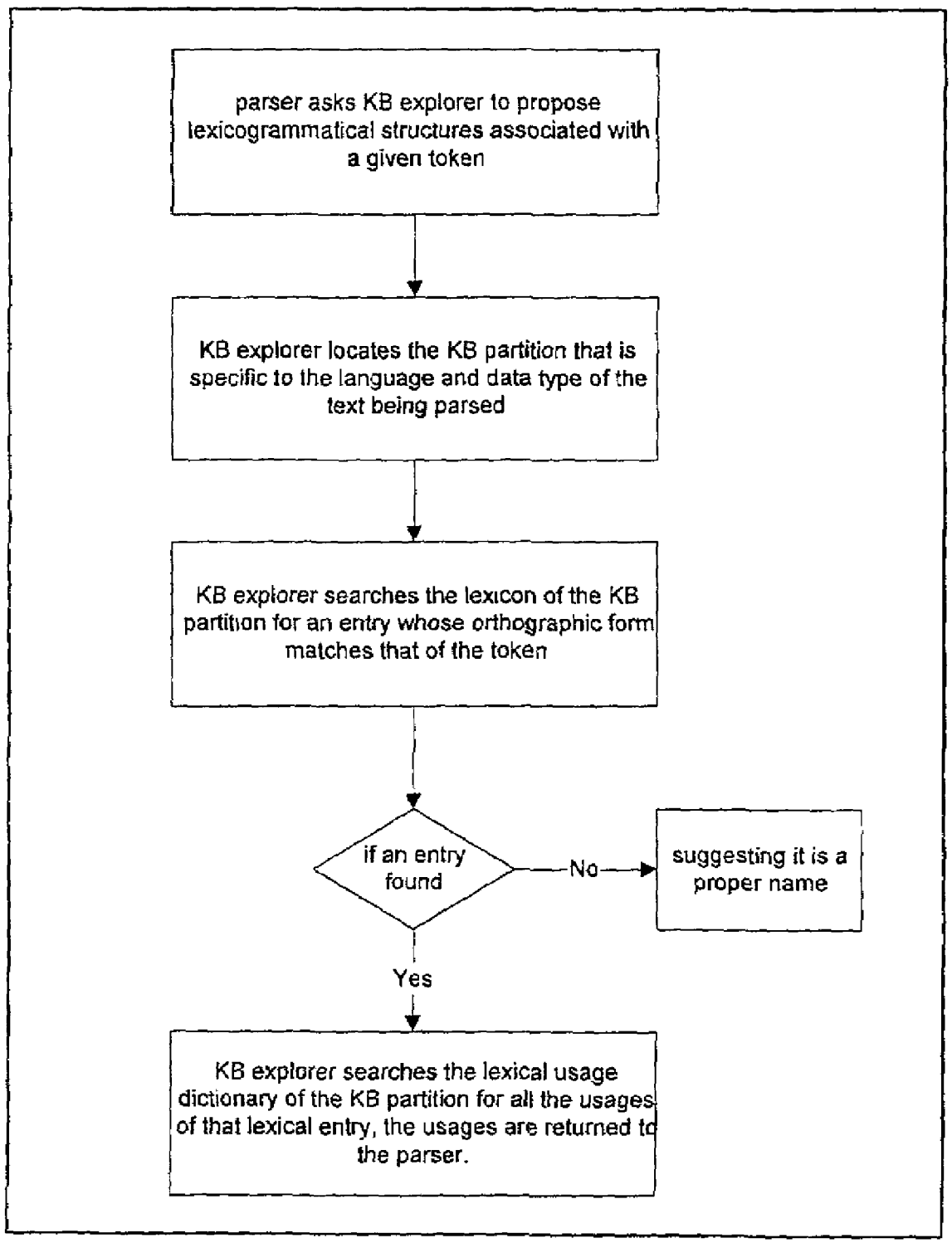
FIG. 7 is a logic flow diagram of the construction of a token space for the system of FIG. 1.
Figure 8:
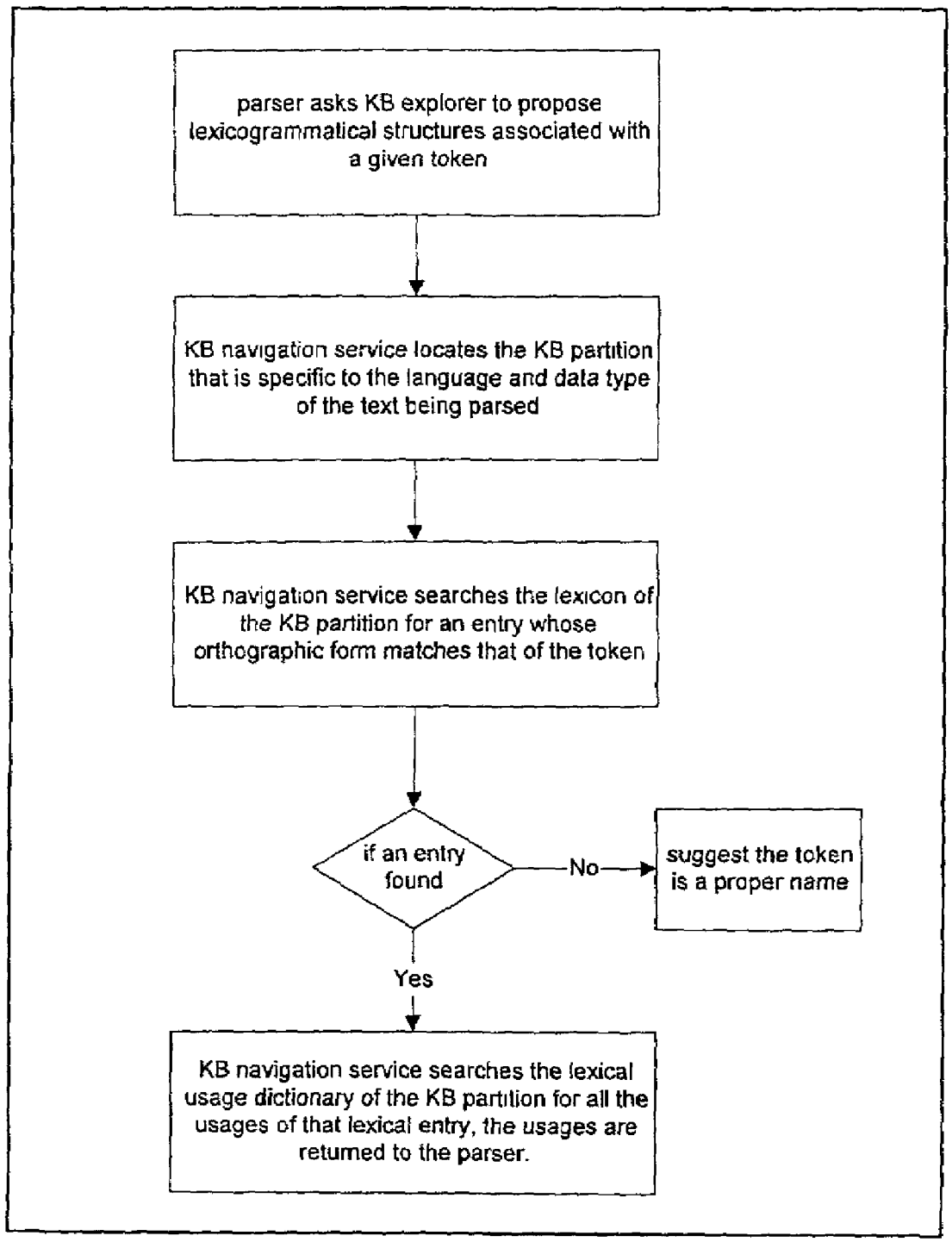
FIG. 8 is a logic flow diagram of a method of proposing lexico-grammatical patterns for the system of FIG. 1.

The parser uses the tokenization service of the knowledge base to construct the token space. The construction takes two steps: (1) locating a tokenizer appropriate for a given language and data type. For example, Chinese text and English text require different tokenizing algorithms. (2) invoking the tokenizer to tokenize text. This is illustrated in FIG. 7.

Proposing Lexicogrammatical Patterns

After the parser 15 has obtained a token space, it scans through the tokens in the token space from left to right. For each token it encounters, it attempts to infer some meanings from the token and then creates an information structure. The first step in this inference is to associate the token to lexical items and grammatical patterns the token can possibly participate in. Because of lexical ambiguity (eg. "st" could mean both an abbreviation for the word street and a name prefix) and grammatical ambiguity (eg. "x street" could be a single street, or a street in a street intersection), such association is non-deterministic and could be revoked later. We call this process proposing lexicogrammatical patterns. The algorithm is shown in flow diagram form in FIG. 8.

Matching Lexicogrammatical Patterns

Figure 9:
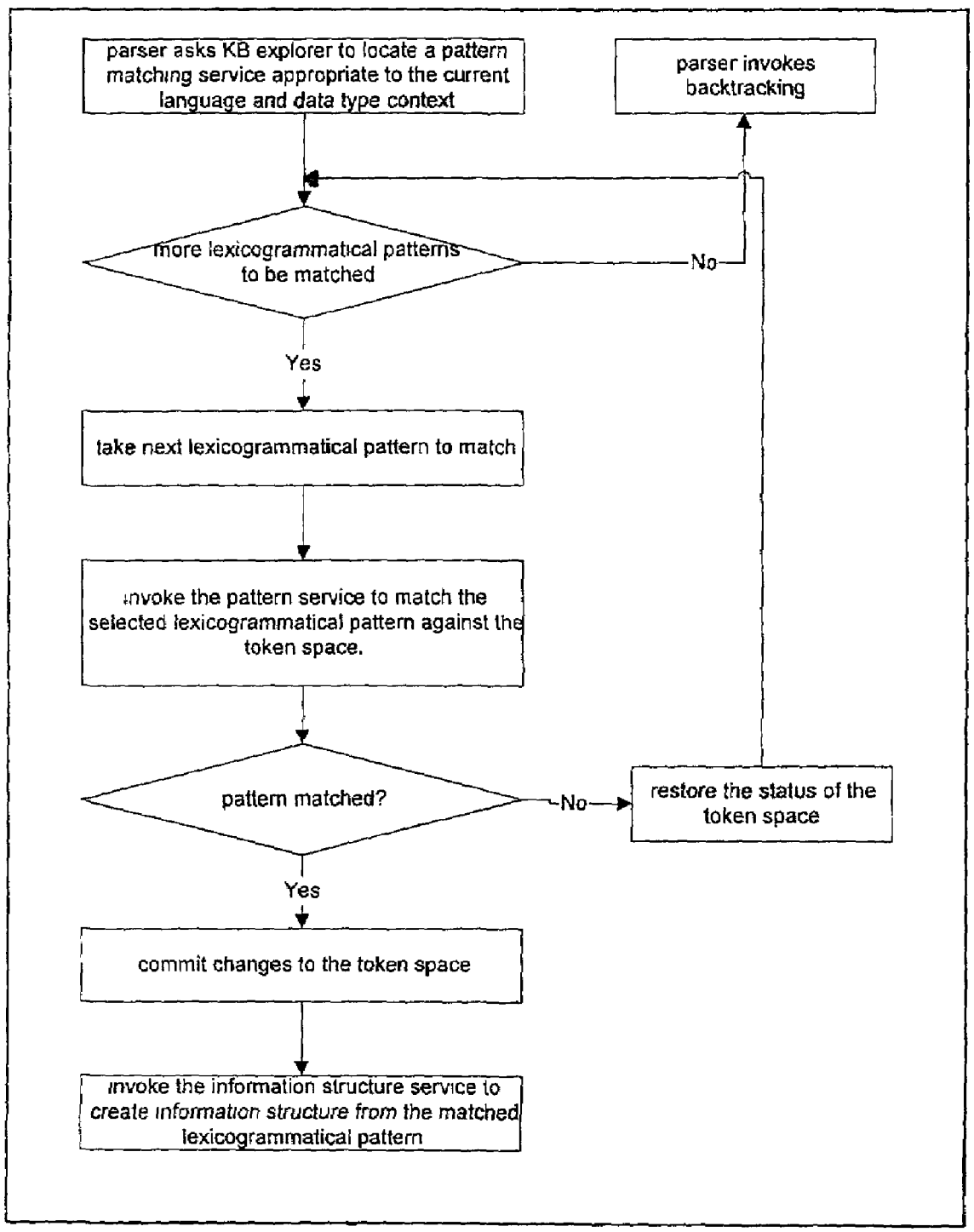
FIG. 9 is a logic flow diagram for a method of matching lexico-grammatical patterns which can be invoked by the parser of FIG. 1.

When a lexicogrammatical pattern has been proposed for a token, the parser then invokes the lexicogrammatical pattern matching service to verify that the proposed lexicogrammatical pattern is supported by the input text. The basics of the pattern matching algorithm is the well-known regular-expression recognition. However different languages may require different algorithms or may extend the basic regular-expression recognition algorithm to handle special cases. Since multiple lexicogrammatical patterns may be proposed for a single token, the parser keeps matching each of the patterns against input until a pattern is matched. The patterns that are not yet matched are kept and will be used in case the parser backtracks to the same token. This algorithm is illustrated in FIG. 9.

Constructing and Refining Information Structures

Figure 10:
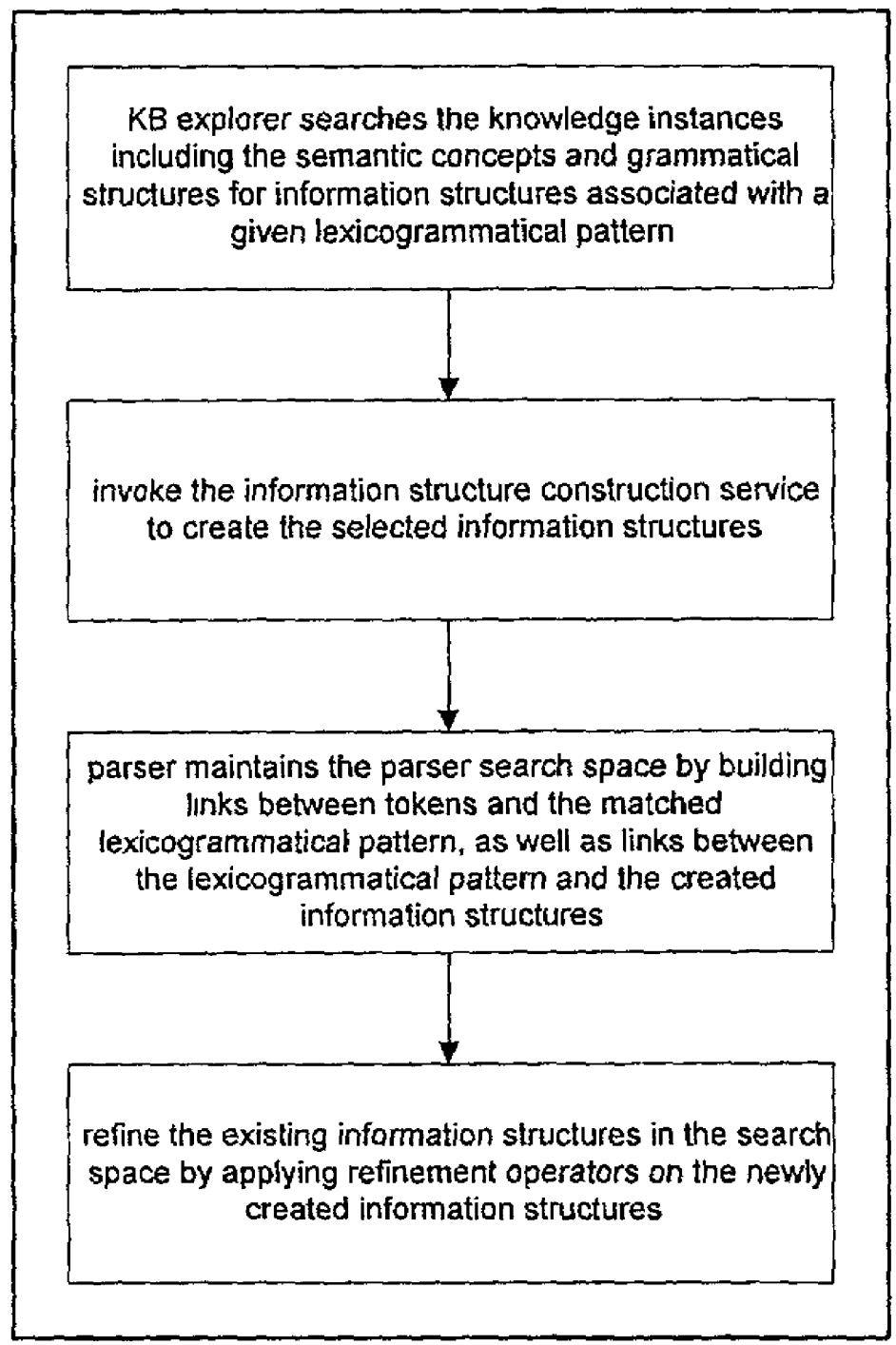
FIG. 10 is a logic flow diagram of the iterative refinement procedure which can be invoked by the parser of FIG. 1.

After the pattern matching service has matched a proposed lexicogrammatical pattern against the token space, the parser sanctions the pattern by invoking the information structure service to create the information structures associated with the lexicogrammatical pattern. Inside the information structure service, the knowledge base explorer excavates the information structures associated with the matched lexicogrammatical pattern and then instantiates them. The newly instantiated information structures are then weaved into the existing information structures through the refinement process. The algorithm is shown in FIG. 10.

Determining Soundness and Completeness of Information Structures

At each cycle of parsing, the parser 15 checks for the sound and complete state of parsing. If a sound and complete state has been achieved, the parser declares parsing for the input text as being successful.

An information structure, as illustrated in the example definition of KRL, consists of a type specification as well as a list of slots. Every slot can constrain on the type of fillers that can fill up the slot.

Soundness. An information structure is sound if every filler conforms to the type constraint of a slot. If a filler of this information structure is itself an information structure, this filler must be sound as well.

Completeness. An information structure is complete if all the non-optional slots are filled in with values. If a filler of this information structure is itself an information structure, this filler must be complete as well.

The knowledge base navigation service accesses the definition of the semantic concept from which an information structure is derived to determine its soundness and completeness.

PARSER REFINEMENT OPERATORS

Refinement Operators

Parser 15 uses a set of refinement operators to assimilate newly created information structures to the existing information structures. When a new information structure is constructed, parser 15 attempts to determine in what way the new information structure extends the semantic and lexicogrammatical coherence of the existing information structures. A fundamental premise underlying parser 15 is that each piece of information conveyed by the lexicogrammatical structures of the input text contributes to an overarching semantic coherence. The refinement operators are applied at each step of the parsing process to ensure that each information structure built over the newly processed input tokens progressively extends the overall coherence. The algorithm of applying refinement operators is presented in the pseudo code below:

After a new information structure has been proposed, the information structure refiner scans through the existing information structure.

Information structure refiner compares the applicability context of a refinement operator for each pair of an existing information structure and a new information structure.

If (an applicability context of a refinement operator is recognized)

This refinement operator is applied to the pair of the new and old information structures such that the new information structure extends the existing one coherently in semantics.

Parser 15 currently uses five operators. They are:
Elaboration operator;
Encapsulation operator;
Enhancement operator;
Entailment operator;
Extension operator;

Each operator has an applicability context defining the semantic relations between an existing information structure and a new information structure, as well as a set of actions that can assemble the new information structure into the existing ones. If the applicability context of an operator is recognised in the parser search space, the associated set of actions is executed.

Elaboration Operator

Figure 11:
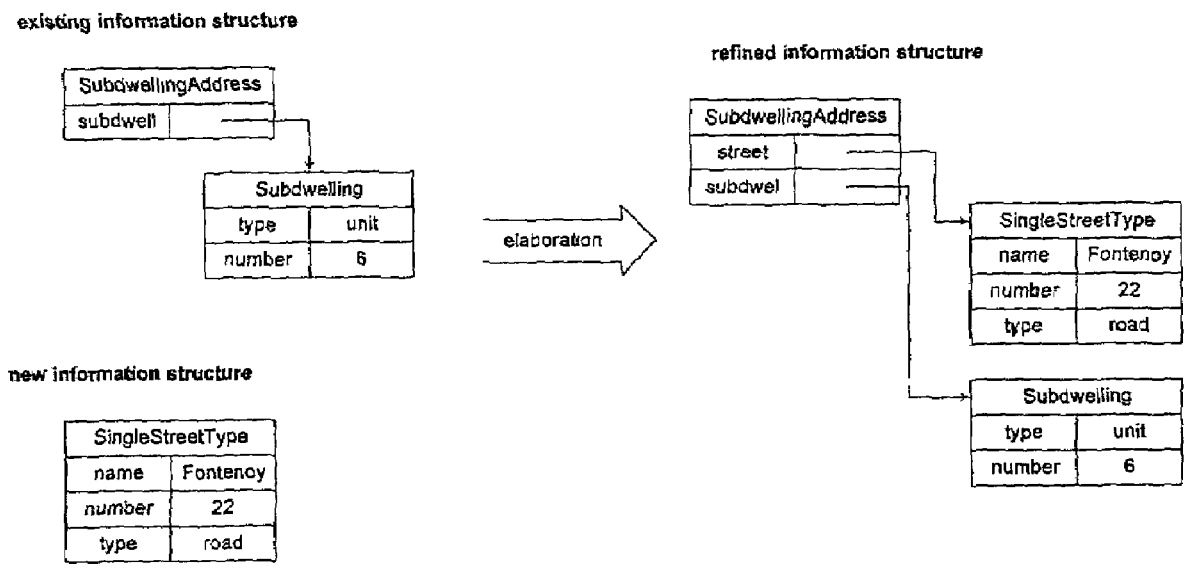
FIG. 11 is a block diagram of production of a refined information structure through use of an elaboration operator.

An elaboration operator is applied when an existing information structure is expecting a new information structure of a certain type to fill in one of its roles, and when this new information structure does occur in the input. FIG. 11 illustrates a scenario where an elaboration operator is applicable.

Encapsulation Operator

Figure 12:
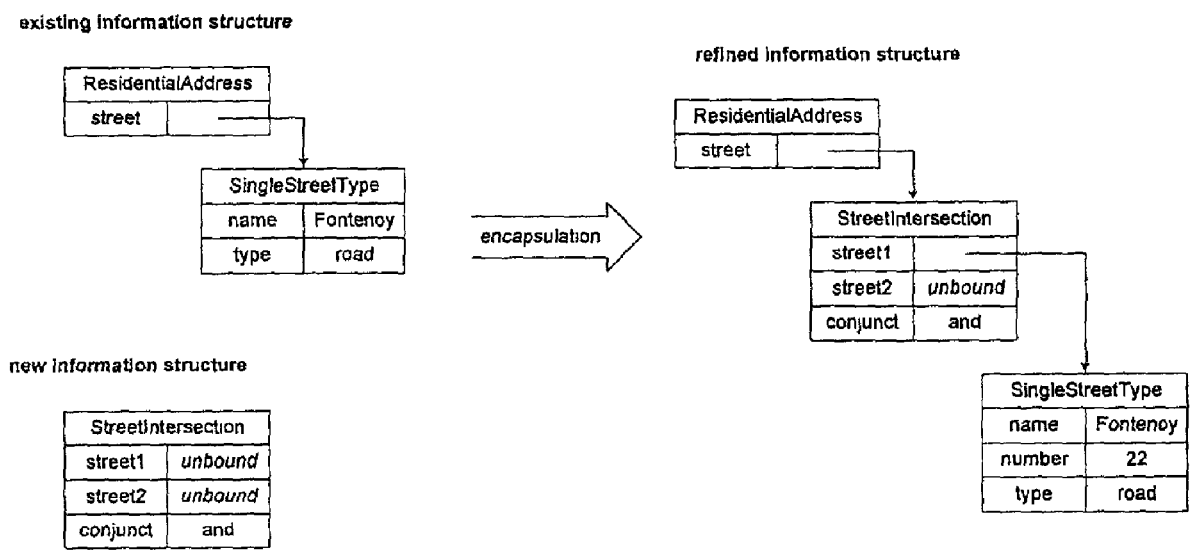
FIG. 12 is a block diagram of the production of a refined information structure utilizing an encapsulation operator.

An encapsulation operator is used when the new information structure can encapsulate an existing information structure. This is typically used in recursive structures such as street compound. For example, if in parsing a street intersection, the parser may consider the first street phrase parsed is the complete street object of the address. When subsequent information (i.e. new evidence that the street is actually part of a street intersection) is available, the parser can encapsulate the first street object in the street intersection. FIG. 12 illustrates this point.

Enhancement Operator

Figure 13:
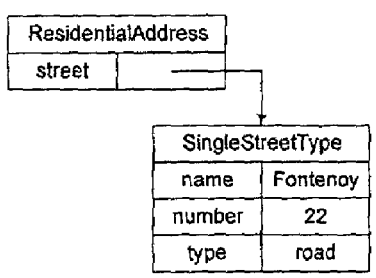
FIG. 13 is a block diagram of production of a refined information structure utilizing an enhancement operator.

An enhancement operator is applied when an existing information structure and a new information structure refers to the same object and mutually provides more information than the other. FIG. 13 illustrates an application of the enhancement operator.

Entailment Operator

Figure 14:
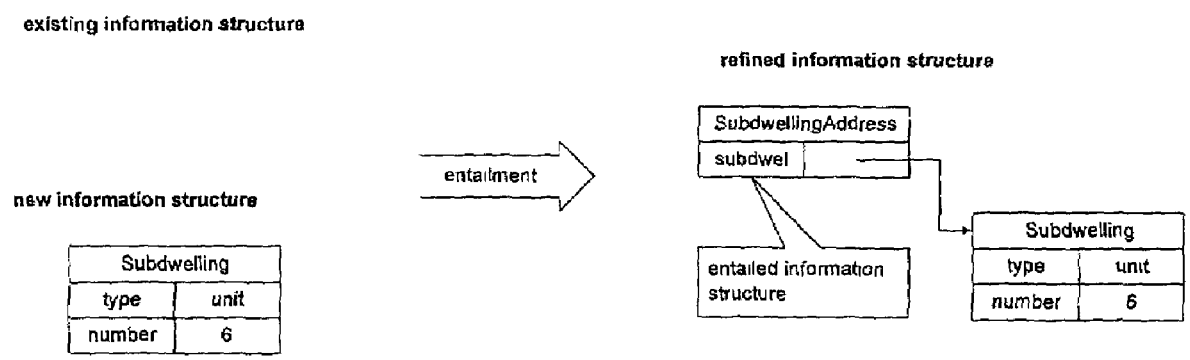
FIG. 14 is a block diagram of production of a refined information structure utilizing an entailment operator.

An entailment operator is applied when a new information structure has implied logical consequence. Entailment asserts the new information structure as well as the logical consequence to the parser search space. FIG. 14 illustrates an application of the entailment operator.

Extension Operator

Figure 15:
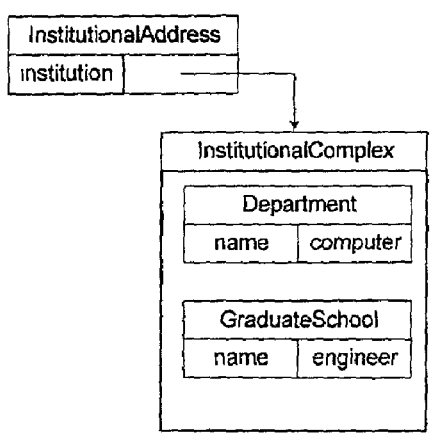
FIG. 15 is a block diagram of the production of a refined information structure utilizing an extension operator.
Figure 15:
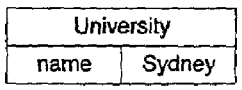
Figure 15:
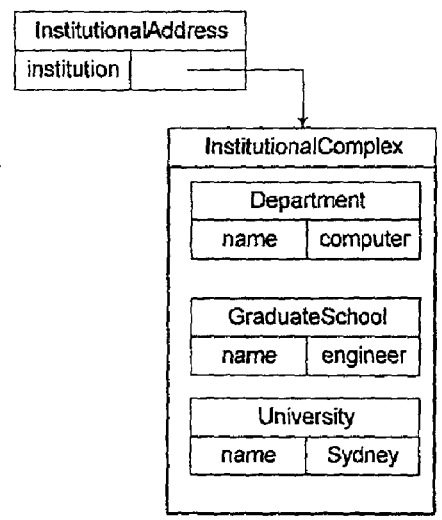

An extension operator is applied when the parser is parsing "container-contained" semantic relations. When parser 15 determines that the new information structure is an extension of the existing container-contained relationship, it applies the extension operator. FIG. 15 illustrates an example when extension operator is applied.

EXAMPLE 1

An example of the parsing system 10 previously described will now be given as "Example 1" with general reference to FIGS. 16 to 19 and more particularly FIGS. 19.1 to 19.5 illustrating steps in the parsing process with reference to a particular data set in some detail.

Conceptually the parsing architecture comprises five elements: input buffer 11, parser 15, knowledge base 16, incremental address information structure and output data structure 19 and stack 17, as shown in FIG. 1.

Input buffer: the data structure that contains the character string to be parsed. We assume the characters are encoded by UNICODE.

Parser: the process that analyses a sequence of tokens into a coherent information structure of address objects.

Knowledge base: the database that maintains lexicogrammatical and semantic information about classes of names and addresses for a specific language. Knowledge base also supports a simple inference engine with which the parser can reason about lexicogrammatical and semantic information about names and addresses. In addition, the knowledge base also supplies a language specific tokenizer that turns a UNICODE-based character string into a sequence of tokens.

Incremental address information structure: the data structure representing the growth of information contained in an address being parsed.

Stack: the data structure containing under-specified address objects.

Figure 16:
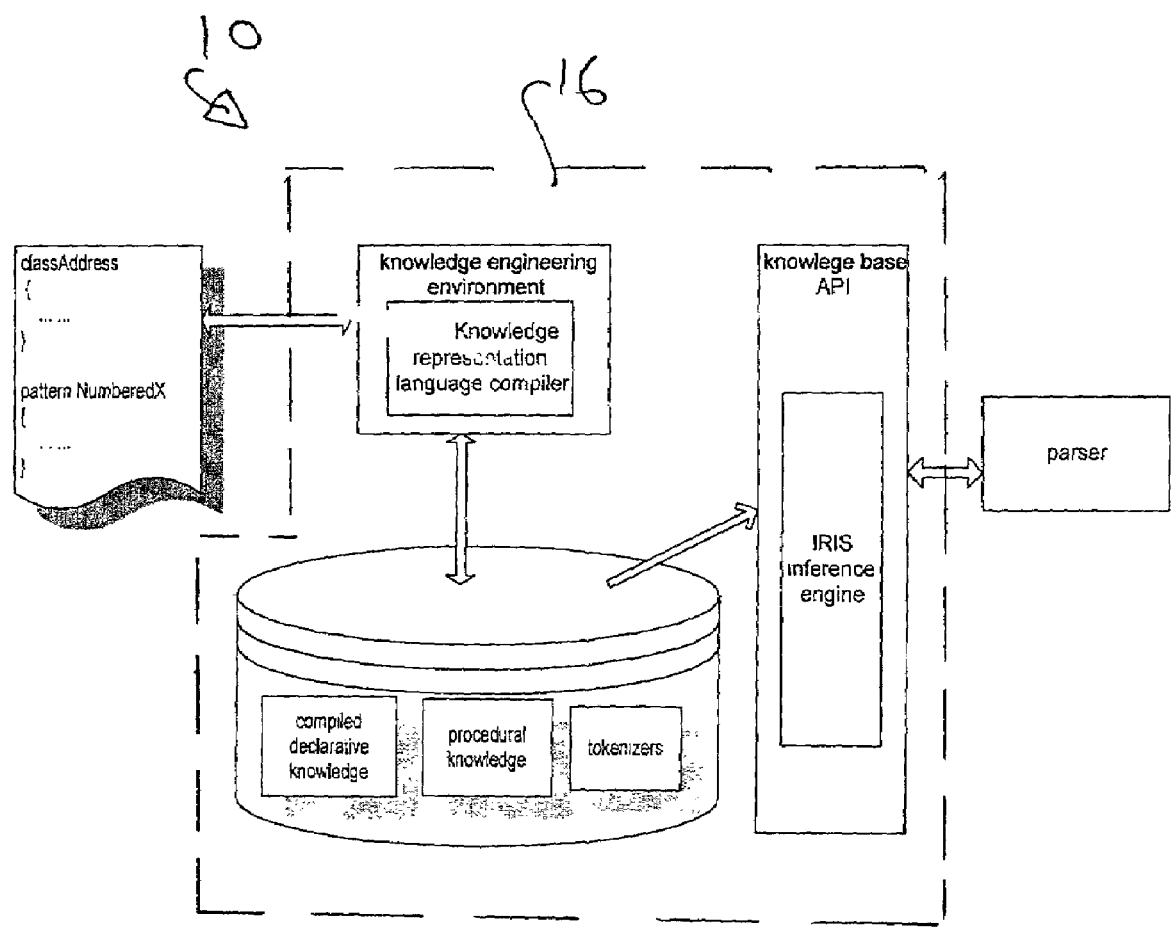
FIG. 16 is a representation in block diagram form of the knowledge database of the system of FIG. 1 in accordance with Example 1.

More particularly, for Example 1, FIG. 16 presents the overall structure of parsing system 10 and its interactions. As shown in FIG. 16. The knowledge base 16, in this example, contains eight major components:

1. Manually edited declarative knowledge. Knowledge engineers use knowledge representation language to define knowledge about names and addresses. The knowledge is contained as textual data.

2. Knowledge engineering workbench (KEW). KEW can be implemented as a stand-alone application that helps knowledge engineers to edit, maintain and validate knowledge developed using KRL. One can think of KEW as equivalent to an integrated development environment for program development.

3. KRL compiler. The compiler compiles KRL-based knowledge into an internal format that can be validated and efficiently accessed by the inference engine.

4. Compiled declarative knowledge. The data structure containing the compiled knowledge. The terse specification of a class or a pattern may be expanded into an elaborated format that enables caching.

5. Procedural knowledge. The knowledge implemented in a high-level programming language, say JAVA. It is used as a complement to declarative knowledge. KB provides a unified method to organise procedural knowledge, and to interact with procedural knowledge from declarative knowledge.

6. Tokenizers. tokenisation is the process that turns a UNICODE-based character string into a sequence of tokens (Note the parser parses at the level of tokens not characters). Depending on the language, a tokenizer can be as simple as recognising white spaces as boundaries of tokens, or as complex as employing a large lexicon and complex algorithms to segment words.

7. knowledge base inference engine. The process that makes decisions based on the knowledge maintained in KB.

8. knowledge base application programming interface:— an application programming interface (API) for accessing and reasoning about the knowledge maintained in the knowledge base 16. The API may be called by the parser and KEW.

Figure 17:
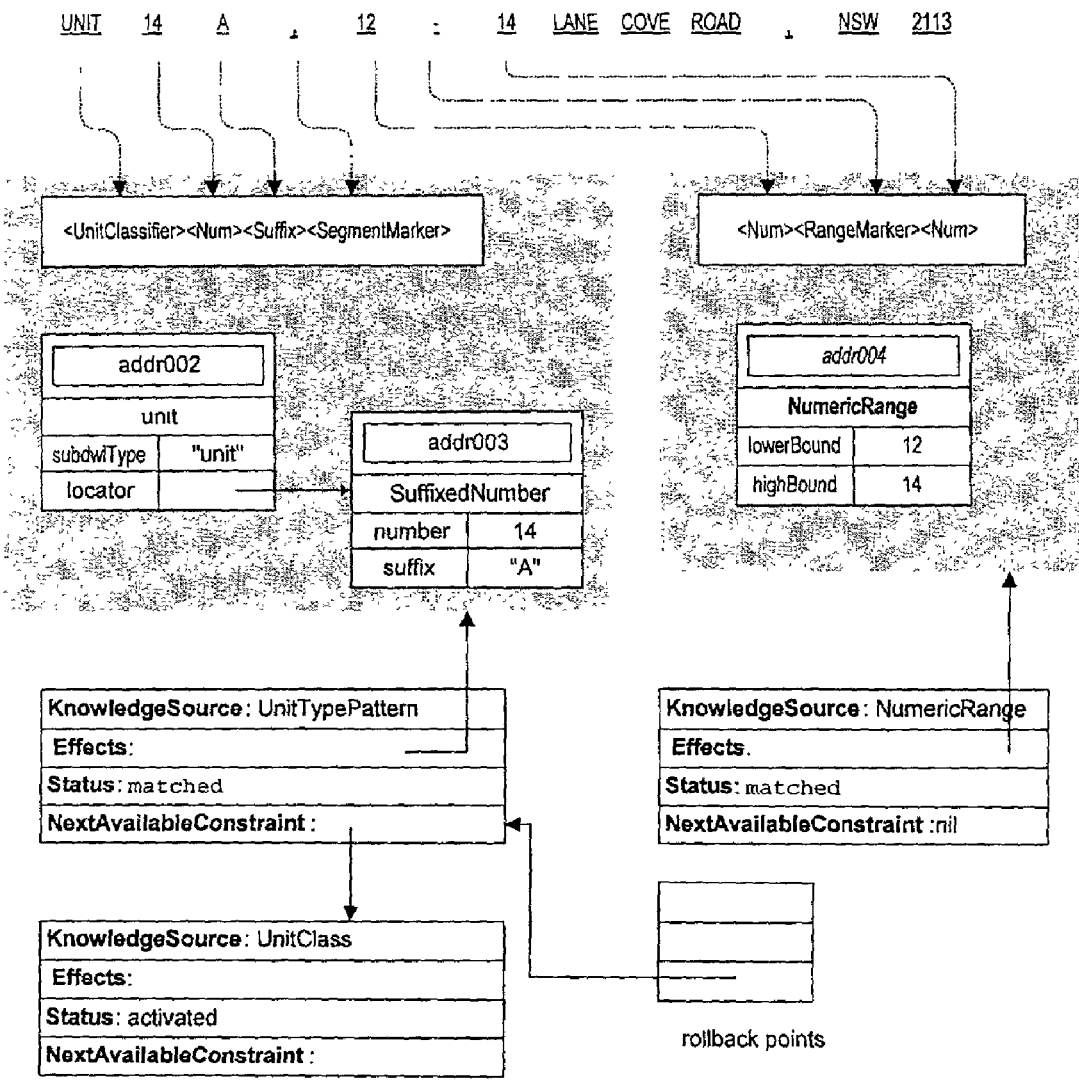
FIG. 17 is a block diagram of the parser search space of the system of FIG. 1 in accordance with Example 1.

With reference to FIG. 17 the parser search space (PSS) is the single most important data structure of parser 15. It is a collection of objects which together represent the final and intermediate results of parsing, maintain multiple search paths and house-keep a history of parser states. The roles it plays during parsing include:

the parser 15 determines the control strategy by studying the situations in PSS;

the parser 15 applies the refinement operators to PSS to construct information structures;

the parser 15 saves snapshots of PSS to enable backtracking;

the parser 15 validates against PSS to determine whether the created information structures are valid, whether any exception has been raised during parsing.

The objects contained in PSS include tokens, lexicogrammatical objects, information structures, constraints, partitions, roll-back points, path and focus. FIG. 17 is a visual representation of a snapshot of PSS.

Token: A token 14 is the smallest unit of string to which the parser can assign a meaning. It is derived by the tokenizer from an input string (i.e. the initial name and address strings). Note a token object is simply an orthographic unit; it does not convey any meaning.

Lexicogrammatical object: a lexicogrammatical object represents a phrase that carries an information structure. It assigns three types of information to tokens:

grouping of a set of tokens into a phrase;

assigning lexical features to each token in the phrase;

representing the ordering of tokens in the phrase;

Information structures: information structure represents the semantics of the input string being parsed. Deriving a sound information structure from an input string is the goal of parser 15. An information structure may be viewed as being continuously refined from an abstract object. This may be called the "horizontal view". Alternatively, it may be viewed as undergoing different levels of realisation, from string, to tokens, to phrases and finally to semantics. This may be called the "vertical view".

Constraints: a constraint represents an instance of applying knowledge to PSS. When a class or a pattern of name and address objects are proposed to PSS, parser 15 creates a constraint object. A constraint has four properties:

knowledge source: a reference to a class or a pattern of name and address objects that are proposed to elaborate PSS. The parser uses the lexicogrammatical patterns and semantic structures attached to the class or the pattern to refine and validate PSS.

effects: the lexicogrammatical objects and information structures created by applying the knowledge source. Effects capture the states of parser. If a constraint is later discovered to be invalid, the parser could roll back to a previous parser state to removing effects from PSS.

status: a constraint undergoes several stages in its life-cycle in PSS. Status is a symbolic value indicating the stage a constraint is at in its life cycle. See the table below.

next available constraint: since there could be several applicable knowledge sources (for example, a token can be ambiguous, or a pattern subsumes a class), PSS needs to maintain alternative constraints that are applicable to the same token. The Next available constraint indicates which constraint to try next if the present constraint has failed. Note because of the precompilation of applicable constraints, it is assumed here that the present constraint is more applicable than the constraint indicated by the next available constraint.

The table below describes the seven possible statuses of a constraint:

| status | Meaning |
| --- | --- |
| 1 activated | the constraint is potentially applicable to a token, thus activated. |
| 2 extended | a new token is shifted into PSS, and matches the lexico-grammatical pattern one token forward. So the constraint stays. |
| 3 matched | the lexicogrammatical pattern of the constraint is fully matched by the tokens. So the constraint is ready to be proposed. |
| 4 rejected | the constraint is rejected. There could be two cases of rejection: the lexicogrammatical pattern does not match, or the proposed information structure fails to unify with previous information structures. |
| 5 proposed | the information structures associated with the knowledge source are introduced into PSS. |
| 6 inferred | further information structures that are the logical consequence of the knowledge source are also introduced. They are then unified with existing information structures in PSS. |
| 7 completed | the constraint is successfully applied to PSS. |

Constraints are explicit objects representing what knowledge sources are selected and applied to transform tokens into information structures. This enables parser 15 to implement look-ahead and backtrack strategies by keeping track of the history of parsing.

Partition: a partition is a collection of lexicogrammatical objects and information structures. It is used to represent the effects of a constraint.

Figure 18:
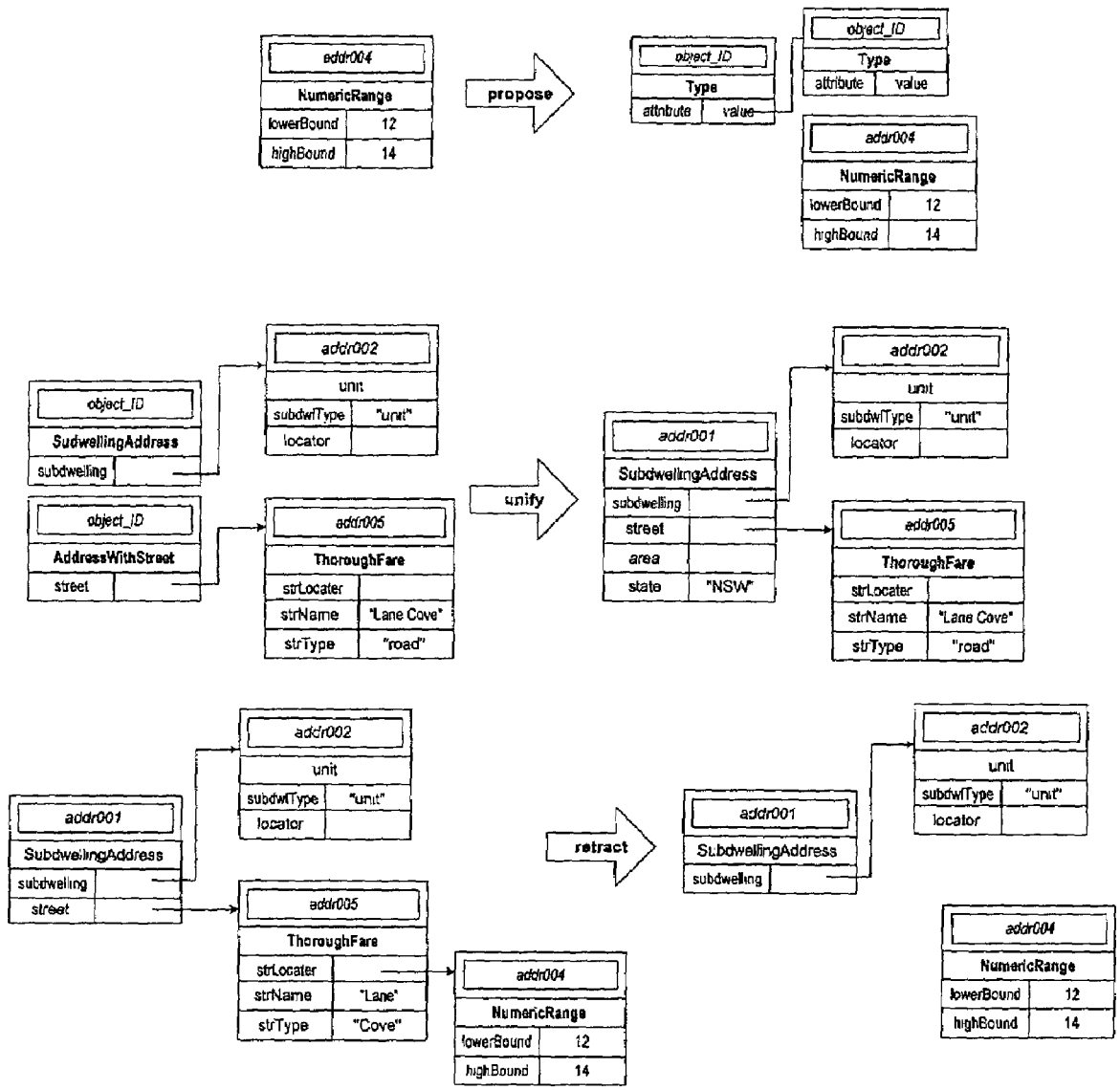
FIG. 18 is a block diagram of parser operations of the parser of the system of Example 1.

Roll-back points: a stack recording the constraint that the parser should return to when a constraint fails. The parser picks up the last saved roll-back point, and then deletes all the effects of the constraints between the failed constraint and the last saved backtrack point. Backtrack points are saved when the parser has several alternative constraints that are applicable to the same group of tokens, and has no way but to try out one first. FIG. 18 provides an instance of the backtracking parser strategy, and how the backtrack points are saved.

Path: the set of constraints whose status are matched. In FIG. 18, UnitTypePattern and NumericRange form a path, but not UnitClass and NumericRange. Although PSS maintains several alternative constraints, only one path is maintained at a time, representing the interpretation the parser commits to.

Focus: a reference of the constraint the parser is working on at the moment.

In this example there are three types of operations the parser can perform on information structures: propose, unify and retract. The propose operator creates an initial address object out of some lexico-grammatical tokens. The unify operator refines an existing address object by way of specialising it, extending it with new attributes and values, and linking it to other address objects. The retract operator restores an information structure to a previous state. The three operators are pictorially represented in FIG. 18.

With reference to FIGS. 19.1 through to 19.5 the reader is stepped through an example iteration of the system of FIG. 1 as exemplified in detail with reference to FIGS. 16 to 18.

FIG. 19.1 illustrates the steps of tokenizing.

FIG. 19.2 illustrates how address objects are built after parsing the tokens "unit 14A".

FIG. 19.3 illustrates the holder of temporary information in stack 17.

FIG. 19.4 illustrates the application of the steps of inference and unification with the final address information structure resulting from the process illustrated in FIG. 19.5.

The above describes only some embodiments of the present invention and modifications, obvious to those skilled in the art, can be made thereto without departing from the scope and spirit of the present invention.

INDUSTRIAL APPLICABILITY

The parsing system described in the specification and component parts of it can be implemented in hardware, software or a combination of the two so as to provide, for example, a system for the processing of name and address information whereby essentially the same information is made available for use on a different platform or in a different context.

The invention claimed is:

1. A system for parsing unstructured, or partially structured, name and address data in any language and script so as to produce structured name and address data; said system comprising:
   a. Knowledge base which analyses said unstructured or partially structured, name and address data at a number of levels, including at a lexicogrammatical level and an orthographic level and a semantic level and a contextual level, wherein linguistic theory enables the complete representation of all possible forms of said data;
   b. Computer readable medium, wherein said knowledge base is stored upon said computer readable medium;
   c. Knowledge base using a knowledge representation language wherein said knowledge base can build a complete representation of all possible forms of said data provided in any language and script, from any country;
   d. Knowledge base containing a knowledge representation layer, a knowledge base management layer, a language programming interface layer and a language inference layer containing an inference engine;

e. System processing at least portions of said unstructured or partially structured name and address data in an incremental manner, involving multiple parsing steps, whereby at each parsing step said inference engine utilizes an inference strategy, represented within a number of inference modules that reason about the language knowledge based on knowledge instances maintained in the knowledge base management layer, to build a body of executable knowledge about patterns contained in said data, thus producing more structured data that may be submitted to further parsing steps until fully structured data is produced.

* * * * *